United States Patent
VanDuyn et al.

(10) Patent No.: US 7,450,226 B2
(45) Date of Patent: Nov. 11, 2008

(54) GRAY BALANCE CALIBRATION OF AN IMAGING SYSTEM

(75) Inventors: Robert M. VanDuyn, Rochester, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/106,956

(22) Filed: Apr. 15, 2005

(65) Prior Publication Data

US 2006/0232771 A1    Oct. 19, 2006

(51) Int. Cl.
*G01J 1/10* (2006.01)
(52) U.S. Cl. .................... 356/243.5; 356/402
(58) Field of Classification Search .............. 356/243.5, 356/402, 243.1, 425
See application file for complete search history.

(56) References Cited

U.S. PATENT DOCUMENTS

| | | |
|---|---|---|
| 5,285,297 A | 2/1994 | Rose et al. |
| 5,296,935 A | 3/1994 | Bresler |
| 5,339,176 A | 8/1994 | Smilansky et al. |
| 5,594,557 A | 1/1997 | Rolleston et al. |
| 5,598,272 A | 1/1997 | Fisch et al. |
| 5,604,567 A | 2/1997 | Dundas et al. |
| 5,649,073 A | 7/1997 | Knox et al. |
| 5,754,184 A | 5/1998 | Ring et al. |
| 5,781,206 A | 7/1998 | Edge |
| 5,877,787 A | 3/1999 | Edge |
| 5,936,741 A | 8/1999 | Burns |
| 6,005,968 A * | 12/1999 | Granger ...................... 382/162 |
| 6,027,201 A | 2/2000 | Edge |
| 6,067,406 A | 5/2000 | Van Hoof et al. |
| 6,108,442 A | 8/2000 | Edge et al. |
| 6,215,562 B1 | 4/2001 | Michel et al. |
| 6,232,954 B1 | 5/2001 | Rozzi |
| 6,435,654 B1 | 8/2002 | Wang et al. |
| 6,439,722 B1 | 8/2002 | Seegers et al. |

(Continued)

OTHER PUBLICATIONS

"Digital Color Imaging Handbook", edited by Gaurav Sharma, CRC Press, 2003, pp. 271-379.
ICSync Brochure, Color Management Software; GretaMacbeth; http://www.thetascan.fr/Imagenie_Pro/GretagMacbeth/Documetations/Doc_EN/icsync_en.pdf, pp. 1-2; 2000.
WebSync Brochure; GretaMacbeth; http://www.thetascan.fr/Imagenie_Pro/GretagMacbeth/Documetations/Doc_EN/websync_en.pdf, pp. 1-6; 2000.
Color Business Report, Index by Product Type; Blackstone Research Associates; http://www.blackstoneresearch.com/proind.html, pp. 1-49; Dec. 1998.

*Primary Examiner*—Gregory J Toatley, Jr.
*Assistant Examiner*—Tri T Ton
(74) *Attorney, Agent, or Firm*—Miele Law Group PC

(57) ABSTRACT

A calibration system includes a printer capable of being calibrated and a printable calibration sheet. The printable calibration sheet includes at least one calibration reference segment printed on the sheet and one or more defined printing spaces on the sheet. The at least one calibration reference segment includes one or more pre-selected colorants on the printable sheet. The one or more defined printing spaces are adjacent to the at least one calibration reference segment. The one or more defined printing spaces are arranged to accept printing of a color pattern from a printer under calibration.

20 Claims, 5 Drawing Sheets

U.S. PATENT DOCUMENTS

| | | | |
|---|---|---|---|
| 6,480,299 | B1 | 11/2002 | Drakopoulos et al. |
| 6,483,607 | B1 | 11/2002 | Vande Capelle et al. |
| 6,559,944 | B1 | 5/2003 | Van Aken et al. |
| RE38,180 | E | 7/2003 | Edge |
| 6,597,454 | B1 | 7/2003 | Berg et al. |
| 6,606,167 | B1 | 8/2003 | Rees et al. |
| 6,608,925 | B1 | 8/2003 | Edge et al. |
| 6,611,666 | B2 | 8/2003 | Regelsberger et al. |
| 6,686,953 | B1 | 2/2004 | Holmes |
| 6,694,109 | B1 | 2/2004 | Donaldson et al. |
| 6,707,938 | B2 | 3/2004 | de Queiroz et al. |
| 6,804,025 | B1 | 10/2004 | Ueda et al. |
| 6,844,931 | B2 | 1/2005 | Ehbets |
| 6,853,387 | B2 | 2/2005 | Evanicky et al. |
| 6,870,614 | B2 | 3/2005 | Graf et al. |
| 2005/0012930 | A1* | 1/2005 | Steinfield et al. ............ 356/425 |

\* cited by examiner

GRAY BALANCE CALIBRATION OF AN IMAGING SYSTEM

BACKGROUND OF THE DISCLOSURE

Aspects of the disclosure relate to an apparatus and a method for visual gray balance calibration of an imaging system. Other aspects relate to an apparatus and a method for visual gray balance calibration of a printer.

An imaging system may exhibit a drift in the color response of a print engine, either over time or as a result of a number of factors. In order to compensate for the drift, a tone reproduction curve (TRC) may be used for each of the printer colorants. For a CMYK printer, colorants are cyan (C), magenta (M), yellow (Y), and black (B) inks or dyes used to reproduce a color of a given pixel in an original image. A TRC may be implemented as a look-up-table (LUT) that maps input color values to output color values. Input color values may, for example, represent C, M, Y, K intensity values at a particular pixel that are used to control the amounts of colorant applied to a substrate (e.g., a printable sheet such as paper) by an imaging system. Output color values may, for example, represent C, M, Y, K intensity values obtained in a calibration process by measuring the colors printed on a substrate at different patches. The output color values may be labeled according to their deviation from a reference color value, for example, +1% cyan, −1% yellow. The mapping of input values to output values may further include calculating an error value. In some systems, this error value represents, for example, a deviation of the measured output color values from reference color values. The input color values are adjusted in accord with a given algorithm to reduce error values. The adjustment of input values may compensate for a drift in the color response of a printing device.

A printer, one type of an imaging system, may be calibrated by a user in one of two ways—by using color measurement equipment (for example densitometers, spectrophotometers, and/or inline sensors) or by a process of visual adjustment.

Visual adjustment calibration involves the use of the highly sensitive human visual system to determine whether or not a printer is in calibration. There are many methods of visual adjustment calibration including, for example variation methods and reference matching methods. Variation methods generally involve user selection of the most preferred patch or image among patches or images that vary in color attributes such as hue and lightness levels. Reference matching methods involve user selection of a freshly printed color patch that looks the most like the reference color sample.

One reference matching technique involves using a gray (or neutral) patch as the reference, and adjusting colorant (e.g. C, M, Y) intensity values until a good visual match is achieved with respect to the gray color. One technique of visual gray-balance calibration involves the use of a reusable pre-printed calibration sheet as the reference sample. In general, this method relies on visual comparison of neutral gray reference samples and neutral gray color patches formed by a printer. This is done by overlaying the pre-printed calibration sheet, which has punched holes, on a freshly printed target sheet.

A second reference matching technique involves simultaneously printing CMY patches and K patches and selecting a CMY patch that most closely matches the K patch. The printed K colorant is close to gray despite drifts in the color response of a printing device. Therefore, the printed K colorant serves as a reference for gray-balance calibration.

SUMMARY OF THE DISCLOSURE

One aspect of the disclosure is directed to a calibration system. The calibration system includes a printer capable of being calibrated and a printable calibration sheet. The printable calibration sheet includes at least one calibration reference segment printed on the sheet and one or more defined printing spaces on the sheet. The at least one calibration reference segment includes one or more pre-selected colorants on the printable sheet. The one or more defined printing spaces are adjacent to the at least one calibration reference segment. The one or more defined printing spaces are arranged to accept printing of a color pattern from a printer under calibration.

BRIEF DESCRIPTION OF THE DRAWINGS

Embodiments will be described with reference to the following drawing figures, in which like numerals represent like items throughout the figures, and in which.

DETAILED DESCRIPTION OF ONE OR MORE EXAMPLE EMBODIMENTS

In embodiments, a "color" may refer, for example, to the appearance of an image, a printed space, and/or a printed reference described in terms of a person's perception of their hue and lightness (or brightness) and saturation. A "colorant" may refer, for example, to cyan (C), magenta (M), yellow (Y), and/or black (B) inks or dyes (or other color inks or dyes) used to reproduce a color of a given pixel in an original image. A "substrate" may refer, for example, to a printable sheet such as paper. A "colorant value" or "color value" may refer, for example, to a C, M, Y, or K (or another color component, e.g., red (R), green (G), or blue (B)) intensity value at a particular pixel location, and such a value may, e.g., be used to control the amount of colorant applied to a substrate by an imaging system. In embodiments, a "match" may refer, for example, to a combination of colorants that most visually resemble a reference color, has similar visual characteristics as a reference color, coincides in visual characteristics with a reference color, is similar to in colorant value as a reference color, and/or is equal in colorant value as a reference color.

Figure 1:
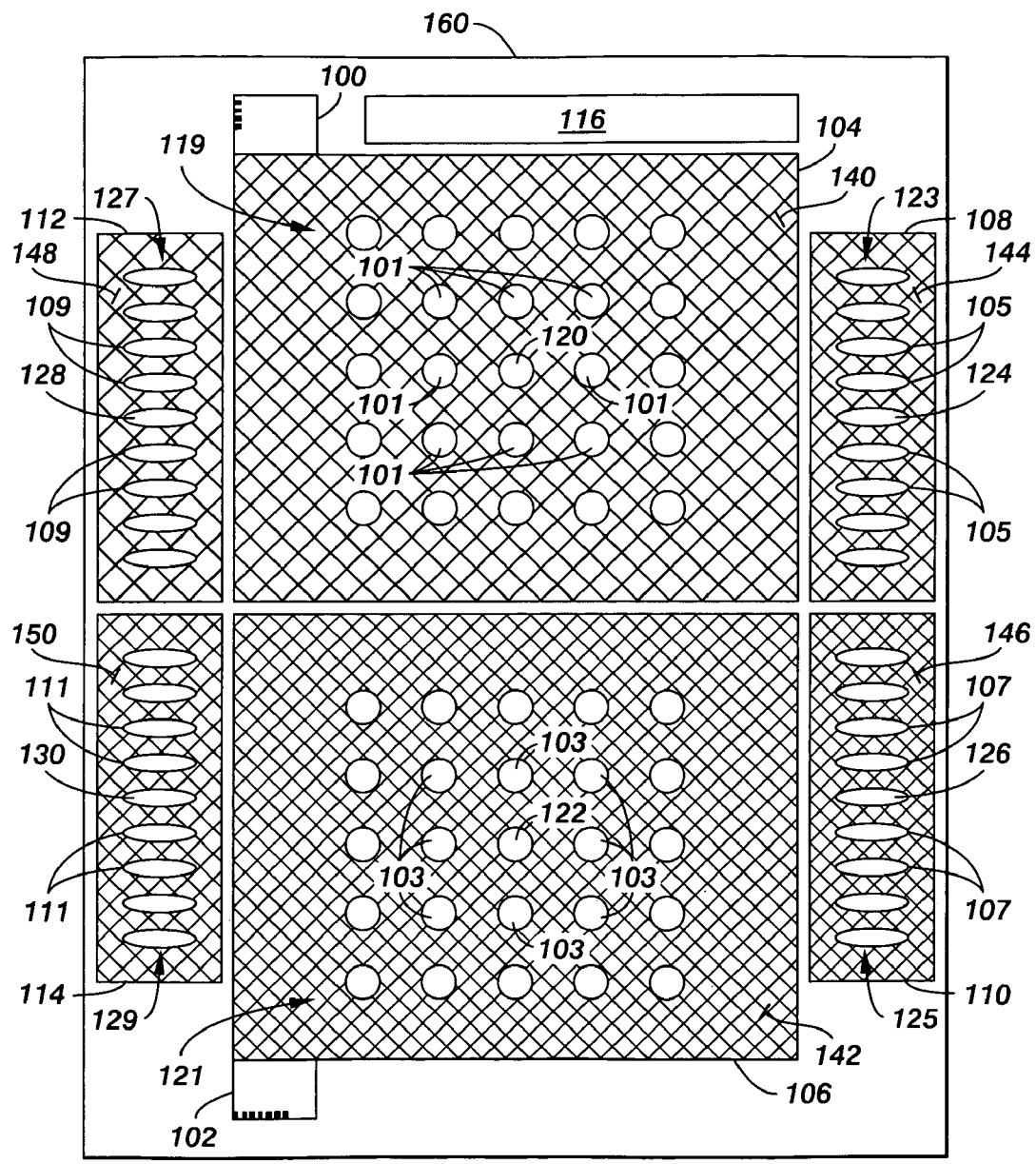
FIG. 1. is an illustration of a calibration sheet according to one embodiment.

FIG. 1 is an illustration of one embodiment of a calibration sheet, generally indicated at 160. Calibration sheet 160 allows calibration of color xerographic printers, electronic copiers, and other types of imaging systems without the need for expensive color measurement equipment. Calibration sheet 160 may be a disposable, pre-printed sheet of a medium of known properties, as will be described below in greater detail, and may be provided as an accessory to a printer or other imaging system requiring periodic calibration. Alternatively, calibration sheet 160 may be sold separately, optionally in quantity. Calibration sheet 160 is one part of a calibration process by which any user, even an inexperienced or unskilled user, may perform the visual gray balance calibration of a printer.

Calibration sheet 160 is printed using the same type of printer and colorants as the printer to be calibrated. Calibration sheet 160 may be printed on a printable sheet (e.g. paper of a given stock quality).

A unique calibration sheet 160 may be provided for each model of a printer or an imaging system so that the colorants, the layout, and the other characteristics of the calibration sheet 160 are correct for that specific printer or imaging system model. Alternatively, if several printer or imaging system models share the same print engine (which, for purposes of this description, may be understood to mean the printing components, including the print head or drum, colorants, and print controlling portions, such as microprocessors, of a larger document processing system), it may be possible or desirable to prepare and use a single calibration sheet 160 for several printer or imaging system models.

When performing a calibration of a print engine, information on several aspects of the print engine's performance is usually gathered. Some or all of the information may be used to recalibrate the print engine. For example, with a CMYK printer, information on the color balance and lightness response achieved with the respective cyan (C), magenta (M), yellow (Y) tone reproduction curves and the lightness level of the black (K) tone reproduction curve may be gathered during a calibration process. Calibration sheet 160 allows each of these elements of the print engine's performance to be calibrated, and in the illustrated embodiment, also includes features to guide the user through the calibration process and to ensure proper alignment during calibration, as will be set forth below in more detail.

More specifically, calibration sheet 160 includes an instruction segment 116, a Y registration segment 100, an X registration segment 102, and a number of printed calibration reference segments. The printed calibration reference segments include a first color balance data point segment 104, a second color balance data point segment 106, a first CMY TRC L* correction data point segment 108, a second CMY TRC L* correction data point segment 110, a first K TRC L* correction data point segment 112, and a second K TRC L* correction data point segment 114. Each calibration sheet segment 116, 100, 102, 104, 106, 108, 110, 112, 114 in the illustrated embodiment is surrounded by, at its periphery, a thin, pure color border (e.g., the color black), although this need not be the case in all embodiments.

The instruction segment 116 provides instructions to guide the user through the tasks of proper calibration of a printer. The registration segments 100, 102 provide information used by a printer under calibration to adjust the X registration and the Y registration of the printable sheet so that the printer prints in the appropriate areas and the incidence of misalignment is reduced. (The term "registration," as used herein, refers to whether or not the printable sheet and the print engine are properly aligned with each other so as to print the correct printed patterns in the correct places.) The X registration segment 102 and the Y registration segment 100 thus help to prevent overprints of the gray-balance target on the reference background and also help to prevent unprinted (blank or white) spaces within a segment's gray balance target areas, both of which may influence the effectiveness of the visual task, and thus the accuracy of the final calibration.

In the illustrated embodiment of the calibration sheet 160, each of the segments 104, 106, 108, 110, 112, 114 includes a number of unprinted patches 101, 103, 105, 107, 109, 111, 120, 122, 124, 126, 128, 130 arranged within. The unprinted patches 101, 103, 105, 107, 109, 111, 120, 122, 124, 126, 128, 130 serve as target areas for printing on the calibration sheet 160. As will be described below in more detail, during the calibration process, the unprinted patches (i.e., defined printing spaces) 101, 103, 105, 107, 109, 111, 120, 122, 124, 126, 128, 130 of the gray balance reference target areas 119, 121, 123, 125, 127, 129 will each be printed with a variation of a gray color (or whatever other calibration color is in use) by the printer under calibration during the calibration process. Although illustrated as elliptical in this embodiment, the unprinted patches of the calibration sheet 160 may take any shape, and the shape of the unprinted patches in one target area 119, 121, 123, 125, 127, 129 of the calibration sheet 160 need not have the same shape as the unprinted patches of any other target area 119, 121, 123, 125, 127, 129.

Each of the color balance segments 104, 106 comprise a color balance reference background 140, 142 and a gray balance target area 119, 121. The gray balance target areas 119, 121 include a number of patches, which are initially unprinted. The patches are preferably numbered for easier identification. The reference backgrounds 140, 142 provide a color balance sample (i.e. a particular combination of colorants) at two different brightness levels.

As will be described in more detail below, during the first phase of the calibration process, the printer under calibration prints the unprinted patches 119, 121, using colorant combinations determined by the colorant values stored in the printer under calibration. The colorant combinations are expected to bracket the desired gray reference color of the reference backgrounds 140, 142. During the second phase of the calibration process, the user compares the freshly printed gray balance patches 119, 121 to the pre-printed reference background 140, 142 of the respective color balance segment 104, 106. The user selects the patch of freshly printed gray balance patches 119, 121 that is the closest visual match to the respective reference background 140, 142, and enters the selected patch's identification number into the calibration application of the printer under calibration. The colorant values used to print the gray balance patches 119, 121 are then used to update the gray-balance TRCs.

In the illustrated embodiment, the reference backgrounds 140, 142 are printed gray using the colorants available to the imaging system. For example, in a four colorant CMYK printer, the reference backgrounds 140, 142 would be printed using the colorants cyan, magenta, and yellow. The reference backgrounds 140, 142 are typically printed gray because the human visual system is believed to be most sensitive to changes in shades of gray; therefore gray is generally accepted as a good color to use for calibration. However, in certain applications, other colors may be used.

Each gray balance target area 119, 121 of the respective segment areas 104, 106 has a primary unprinted patch 120, 122. The primary unprinted patches 120, 122 are located in the middle of the respective segment areas 104, 106 and provide an area where the output values of the current calibration TRCs are to be printed. In each segment, a number of secondary unprinted patches 101, 103 are arranged in such a way that they are uniformly spaced around the primary unprinted patch 120, 122.

As described above, the gray balance target areas 119, 121 are printed using combinations of colorants available to the imaging system during phase one of the calibration process. The secondary patches' 101, 103 of the gray balance target area 119, 121 are printed using combinations of colorants that are determined by the colorant values stored in the printer under calibration. The colorant values of the secondary patches 101, 103 are deterministic perturbations of the colorant values at the primary patch 120, 122. The user can parametrically control the perturbations. For example, the perturbations could be fixed increments in C, M, and Y about the primary patch 120, 122. The perturbation parameters involve a trade-off between providing an adequate range to bracket the desired reference color of the reference background 140, 142, and sufficient sampling of colorant values to ensure that at least one of the secondary patches 101, 103 provides a satisfactory visual match to the reference background 140, 142 of the respective segment areas 104, 106.

The unprinted patches 101, 103 of the gray balance target areas 119, 121 are arranged in the calibration sheet 160 of FIG. 1 as linear and rectangular arrays, although any spacing of the unprinted patches that is compatible with the printer under calibration may be used.

The two phases of the calibration process described above may be iteratively repeated until the best visual match between the freshly printed secondary patches' 101, 103, 120, 122 of the gray balance target area 119, 121 and reference color of the reference background 140, 142 occurs at the primary patch 120, 122, and that the match is satisfactory to the user. A satisfactory match indicates to the user that the updated TRC provides the optimum gray-balance output from a visual standpoint. During the iterations, the perturbation parameters for the secondary patches 101, 103 can be dynamically adjusted to offer an appropriate trade-off between the bracketing range and the sampling resolution, as described above. For example, with subsequent iterations, the bracketing range could be decreased, and the sampling resolution made finer to hone in on the desired reference color of the reference background 140, 142.

The L* correction segments (i.e., lightness correction data point segments) 108, 110, 112, 114 are used to correct the lightness response of the printer's calibration TRCs. Each of the L* correction segments 108, 110, 112, 114 comprise a pre-printed lightness reference background and a lightness target area 123, 125, 127, 129. Each lightness target area includes a column of patches that are initially unprinted. The patches are preferably numbered for easier identification. Assuming a CMYK printing system, two lightness corrections are derived, one for the CMY mixture, and one for the K colorant. The reference backgrounds 144, 146 are pre-printed with a mixture of C, M, Y colorants. Each of the reference backgrounds 144, 146 provides a lightness sample at a known lightness level. The reference backgrounds 148, 150 are printed with only the black (K) colorant.

In the first phase of the calibration process, mentioned above, the unprinted target areas 123, 125, are printed with colorant mixtures that are expected to bracket the lightness level of the reference backgrounds 144, 146 respectively. In the second phase of the calibration process, the user visually compares the freshly printed lightness targets 123, 125 with the pre-printed reference backgrounds 144, 146 of the respective color segments 108, 110. The user selects the patch from the freshly printed target areas 123, 125 that visually provides the closest lightness match with the reference color of the respective reference background 144, 146. The user enters the identification number of the selected patch into the calibration application of the printer under calibration. The calibration application then uses the entered identification information to update the calibration TRCs for the C, M, Y colorants.

In the first phase of the calibration process, the unprinted target areas 127, 129 of the respective color segments 112, 114, are filled with colorant mixtures that are expected to bracket the lightness level of the reference background 148, 150 respectively. In the second phase of the calibration process, the user compares the printed gray balance targets 127, 129 to the reference background 148, 150 of the respective color segment 112, 114. The user selects the patch from the freshly printed gray balance targets 127, 129 that visually provides the closest lightness match to the reference color of the respective reference background 148, 150. The user enters the identification number of the selected patch into the calibration application of the printer under calibration. The calibration application uses the entered information to update the calibration TRC for the K colorant.

Each gray balance target area 123, 125, 127, 129 of the respective segment area 108, 110, 112, 114 has a primary unprinted patch 124, 126, 128, 130. The primary unprinted patch 124, 126, 128, 130 of the illustrated embodiment resides in the middle of the respective segment area 108, 110, 112, 114. The primary unprinted patches 124, 126, 128, 130 provide a lightness target area where the output values of the current calibration TRCs are to be printed by the printer under calibration. A number of secondary unprinted patches 105, 107, 109, 111 of the gray balance reference target areas 123, 125, 127, 129 are spaced and arranged above and below the main color patch 124, 126, 128, 130.

As described above, the gray balance target areas 123, 125, 127, 129 are printed using combinations of colorants available to the imaging system during phase one of the calibration process. The secondary patches' 105, 107, 109, 111 of the respective gray balance target area 123, 125, 127, 129 are printed using combinations of colorants that are determined by the colorant values stored in the printer under calibration. The colorant values of the secondary patches 105, 107, 109, 111 are perturbations of the colorant values at the primary patch 124, 126, 128, 130. The perturbations may be controlled by the user, and provide a way to bracket the desired lightness level.

Phase one and phase two of the calibration process, described above, may be iteratively repeated until the best visual match between the freshly printed secondary patches' 105, 107, 109, 111 of the gray balance target area 123, 125, 127, 129 and the reference color of the reference background 144, 146, 148, 150 occurs at the primary patch 124, 126, 128, 130, and that the match is satisfactory to the user. A satisfactory match indicates to the user that the updated TRC provides the optimum lightness response from a visual standpoint.

The calibration sheet 160 illustrated in FIG. 1 is merely one example of the type of page formatting and layout that might be used for a calibration sheet 160. A calibration sheet 160 may have other designs or arrangements. For example, the layout of the calibration sheet 160 in FIG. 1 could be the inverse of the given arrangement, such that it will have patches pre-printed with calibration samples, and unprinted target areas provided in the background of each segment. Additionally, the calibration sheet 160 may comprise more or less data point segments for color balance or lightness levels depending on the printer's characteristics and the accuracy requirements for the calibration process itself. For example, in the simplest cases in which great accuracy is not required, a user may only be asked to find the best match between the background and three or four patches printed by the printer under calibration.

Figure 2:
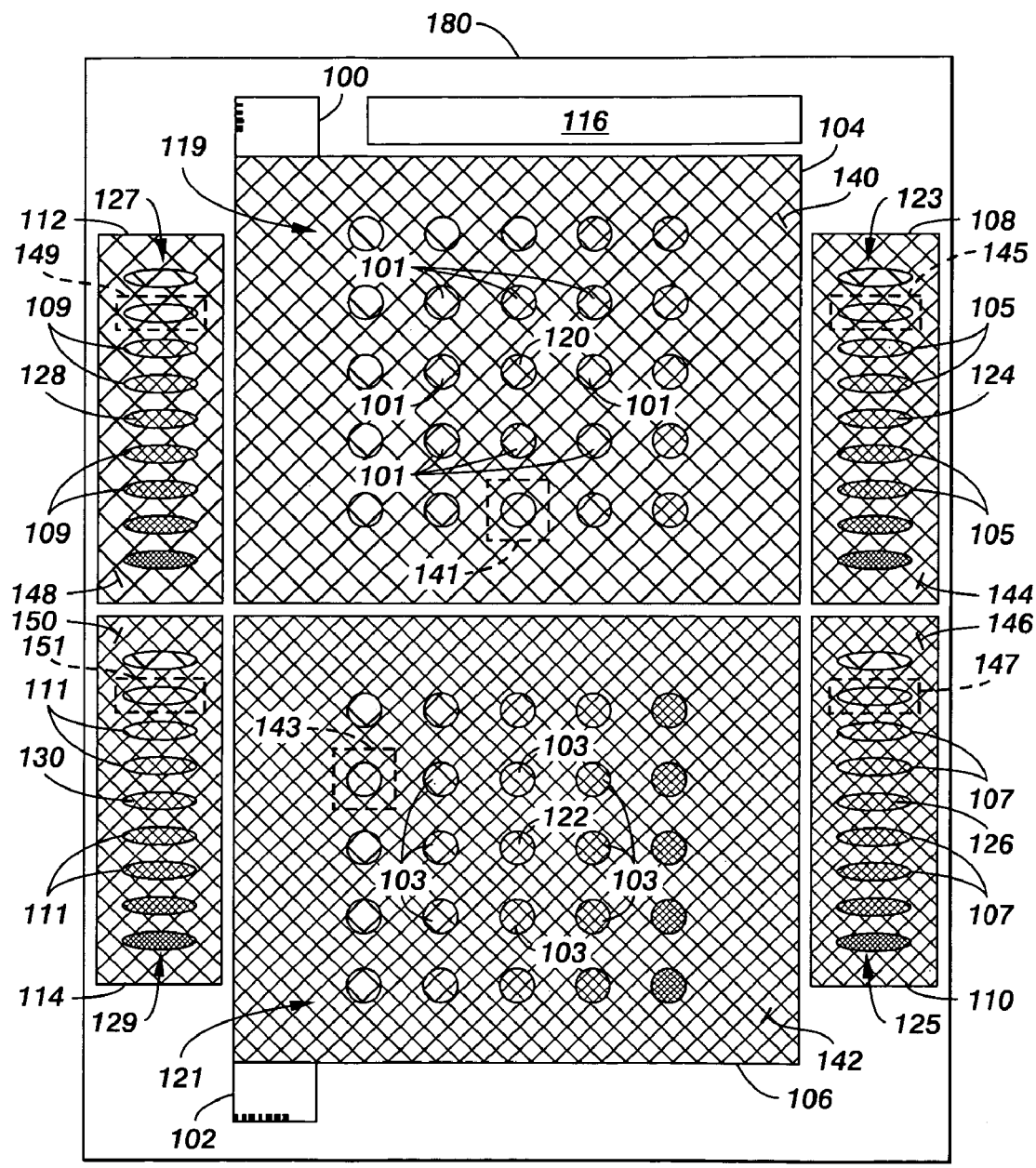
FIG. 2. illustrates the calibration sheet of FIG. 1 with printing from a calibration process.

FIG. 2 illustrates a calibration sheet 160 after printing by a printer under calibration, generally indicated at 180. In a typical calibration process, once the printed color reference sheet 180 has been produced, for each segment 104, 106, 108, 110, 112, 114 of the printed color reference sheet 180, the user locates the printed color patch 101, 103, 105, 107, 109, 111, 120, 122, 124, 126, 128, 130 of the gray balance target areas 119, 121, 123, 125, 127, 129 that best matches the respective reference background 140, 142, 144, 146, 148, 150 (i.e., the patch that cannot be visually distinguished from the background). Each of the segments 104, 106, 108, 110, 112, 114 is particularly adapted to correct a different aspect of the printer's response.

More particularly, the color balance data point segments 104, 106 are used to correct the color balance of the printer under calibration. For the color balance data point segments 104, 106, patches of colorant mixtures (in the illustrated embodiment, mixed toner or ink of the colors cyan, magenta, and yellow), are printed in colors of different saturations around the neutral gray that is the respective reference background 140, 142. The user selects the printed patch that looks most like the pre-printed, invariant gray reference background 140, 142 of the respective color balance segment 104, 106. As shown, in the illustrated embodiment, the patches 141, 143 are the most accurate matches to the reference backgrounds 140, 142 of the respective color balance segments 104, 106. The best-match patches 141, 143 would thus be identified to the printer under calibration in order to generate a data point for the TRC used to establish the color balance.

The data point segments 108, 110 are used to correct the luminance (or lightness L*) levels of the CMY TRCs of the printer under calibration. For the CMY TRC L* correction data point segments 108, 110, patches of colorant (in the illustrated embodiment, mixed toner or ink of the colors cyan, magenta, and yellow) are printed at different luminance levels against a reference background 144, 146. The farther the patch in one direction from the main patch 124, 126 the lighter the patch. The farther the patch in another direction from the main patch 124, 126 the darker the patch. The user selects the printed gray patch that provides the closest visual lightness match with the pre-printed, invariant gray reference background 144, 146 of the respective segment 108, 110. As shown, in the illustrated embodiment, the patches 145, 147 are the most accurate matches to the reference backgrounds 144, 146 of the respective color balance segments 108, 110. The patches 145, 147 showing the best match would thus be identified to the visual calibration application in order to generate a data point for updating the CMY calibration TRCs to create the desired gray balance and lightness levels corresponding to certain known input values.

The data point segments 112, 114 are used to correct the luminance (or lightness L*) level of the black (K) TRC of a printer under calibration. For the K TRC L* correction data point segments 112, 114, patches of K colorant are printed at different luminance levels against a reference background 148, 150. The reference backgrounds 148, 150 are preferably made with K only. The farther the patch in one direction from the main patch 128, 130 the lighter the patch. The farther the patch in another direction from the main patch 128, 130 the darker the patch. The user selects the printed gray patch that provides the closest visual lightness match with the pre-printed, invariant gray of the reference background 148, 150 of the respective segment 112, 114. As shown, in the illustrated embodiment, the patches 149, 151 are the most accurate matches to the reference backgrounds 148, 150 of the respective color balance segments 112, 114. The best-match patches 149, 151 would thus be identified to the visual calibration application to generate a data point for updating the K TRC to generate the desired lightness levels at certain known input values.

Figure 3:
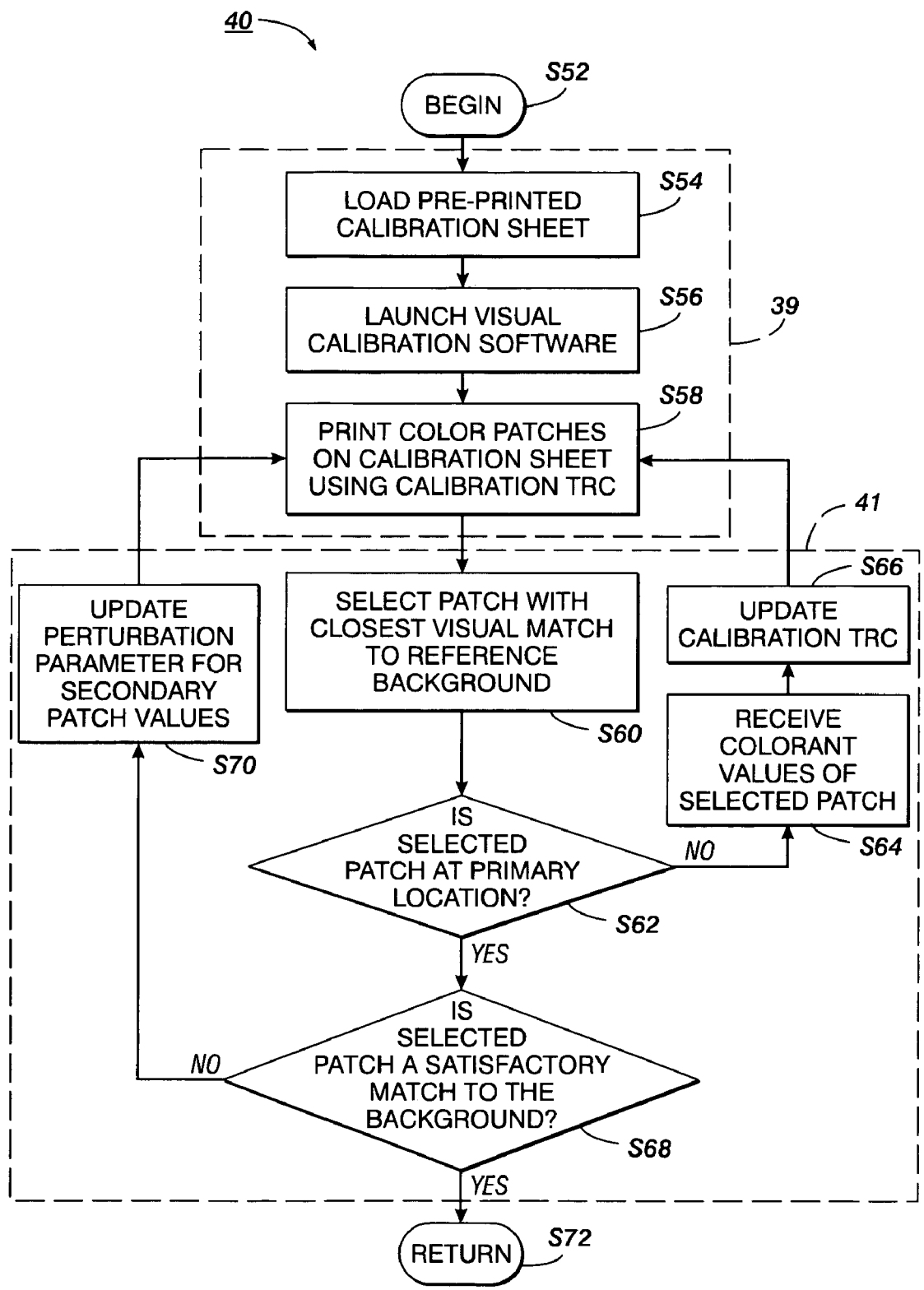
FIG. 3. is a flow chart of a method of calibrating a printer using a calibration sheet.

FIG. 3 is a block diagram illustrating a method of calibrating a printer using a calibration sheet 160 according to one embodiment. Calibration method 40 provides a user with a technique to adjust the digital TRC of a printer calibration system to compensate for the drift in color response of the printing device. In this description of calibration method 40, it is assumed that the user has a printing device compatible with calibration method 40 and a number of calibration sheets 160 with the correct pre-printed colors and patterns for the particular printing device.

Calibration method 40 comprises two phases, phase one 39 and phase two 41. Phase one 39 includes the acts S54, S56, and S58. Phase two 41 includes the acts of blocks S60, S62, S64, S66, S68, and S70.

Calibration method 40 begins at block S52 and continues with the acts of phase one 39 which starts with the tasks of block S54 and continues with block S56 and S58. In block S54, a disposable calibration sheet 160 is loaded into the printer. The manner in which the calibration sheet 160 is loaded into the printer may vary with the type of printer itself. In some embodiments, the calibration sheet 160 may be loaded into the main printer tray; in other embodiments, the calibration sheet 160 may be loaded into an auxiliary tray. Once the printer is loaded in block S54, calibration method 40 continues with block S56, in which the visual calibration software is launched. (It should be noted, however, that in some embodiments, the order of blocks S54 and S56 may be reversed, such that the user loads a calibration sheet 160 when prompted by the calibration software.) "Calibration software" in this context may refer to software or instructions embedded in the printer's memory or firmware, software or instructions loaded on a computer terminal connected to the printer, or, more generally, to any instructions on a machine-readable medium interoperable with a machine to perform the calibration. Once the calibration sheet 160 is loaded, the print engine is alerted to print a plurality of color patches on the calibration sheet 160 using the calibration TRCs, as indicated by block S58. (The layout of the calibration sheet 160 would generally be known to the calibration software, such that the color patches would be printed in the correct places within some margin or error that is correctable by using the registration segments 100, 102.)

After completing the acts of phase one, method 40 continues with the acts of phase two 41. The user views a printed color reference sheet 180 produced in block S58 and selects the patch 141, 143, 145, 147, 149, 151 with the closest visual match to the pre-printed reference background 140, 142, 144, 146, 148, 150 of the respective segment 104, 106, 108, 110, 112, 114, as shown in block S60. Following S60, method 40 continues with S62, a decision act in which it is determined whether or not the selected patch is at the primary location. If the selected patch is not at the primary location (S62: NO), method 40 continues with S64. Once the appropriate colorant values are selected by the user and supplied to the calibration software via an appropriate user interface, any necessary calculations are performed to convert the information supplied by the user into a usable calibration point. The calibration software receives any colorant values of the selected patch, as indicated by block S64. After all the colorant values have been entered, the calibration software updates current TRC output values, as indicated by block S66. Once the TRC output values have been updated, method 40 return to block S58 where the print engine is alerted to print a plurality of color patches on calibration sheet 160 using the calibration TRCs.

If the selected patch is at the primary location (S62: YES), method 40 continues with S68, a decision act in which it is determined whether or not the selected patch 141, 143, 145, 147, 149, 151 is a satisfactory match to the background 140, 142, 144, 146, 148, 150 of the respective segment 104, 106, 108, 110, 112, 114. If the selected patch is not a satisfactory match to the background of the respective segment (S68: NO), method 40 continues to S70 where the perturbation parameter for the secondary patch values is updated. After updating the perturbation parameter for the secondary patch values, method 40 return to S58 where the print engine is alerted to print a plurality of color patches on calibration sheet 160 using the calibration TRCs. If the selected patch is a satisfactory match to the background of the respective segment (S68: YES), method 40 terminates and returns at S72.

Although the illustrated embodiment of the calibration sheet 160 contains segments used to calibrate a number of print engine performance features (e.g., cyan, magenta, yellow and black channel TRC, color balance etc.), a pre-printed calibration sheet need not include segments for each aspect of the print engine's performance. Instead, each pre-printed calibration sheet may include a segment for only one aspect of the print engine's calibration. In that case, single- or limited-segment pre-printed calibration sheets could be provided or sold in sets, the entire set of calibration sheet 160 providing for complete calibration. Particularly if the calibration sheet 160 in use allows calibration of only one or two aspects of the print engine's performance, calibration method 40 of FIG. 3 may be repeated in a series of iterations in which each task provides an adjustment colorant value for color balance or lightness correction. For example, a first iteration may use a pre-printed calibration sheet comprising color balance segments for determining the printing engine's drift in color balance and a second iteration may use a pre-printed calibration sheet comprising lightness correction segments for determining the printing devices drift in lightness levels. Additionally, calibration method 40 may be performed one or more times, in whole or in part, in order to ensure that the calibration sheet 160 is in registration.

Figure 4:
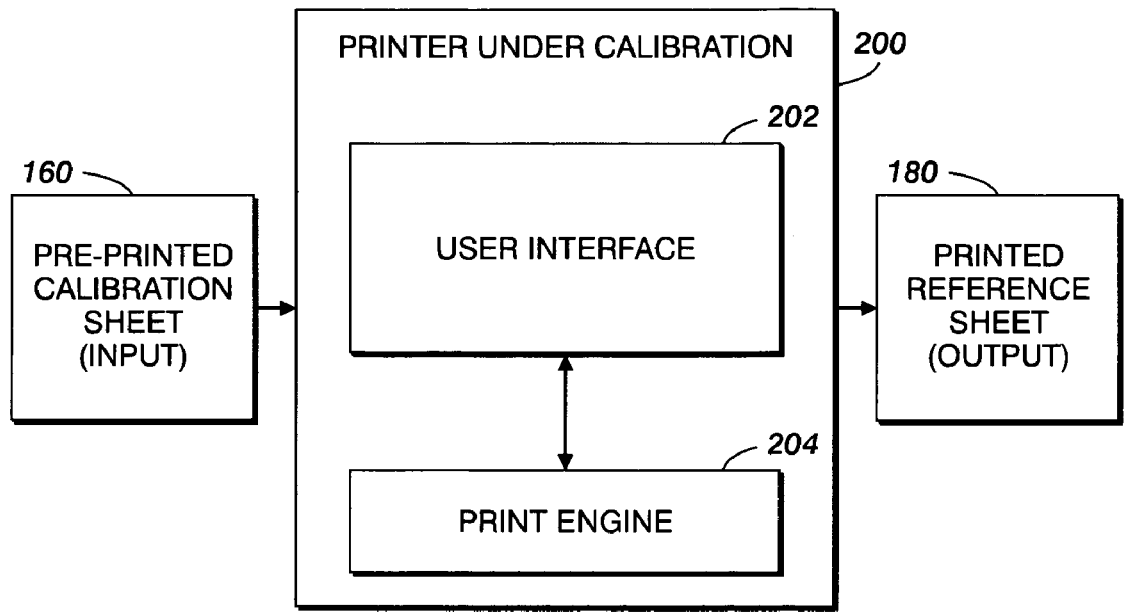
FIG. 4 is a block diagram of a calibration system.

FIG. 4 is a block diagram of the overall calibration process. FIG. 4 includes a printer under calibration 200, a calibration sheet 160, and a printed color reference sheet 180. In the illustrated embodiment, the printer under calibration 200 comprises an user interface 202 and a print engine 204. The components of the printer under calibration 200 will be discussed in greater detail below. FIG. 4 illustrates a typical scenario in which the user activates the calibration mode of a printer through the user interface 202. The calibration sheet 160, described above in FIG. 1, is the input that provides a printable medium to the printer under calibration 200. The printed color reference sheet 180, described above in FIG. 2, is the output that provides data points used to correct the drift in color response of the print engine 204 of the printer under calibration 200.

Figure 5:
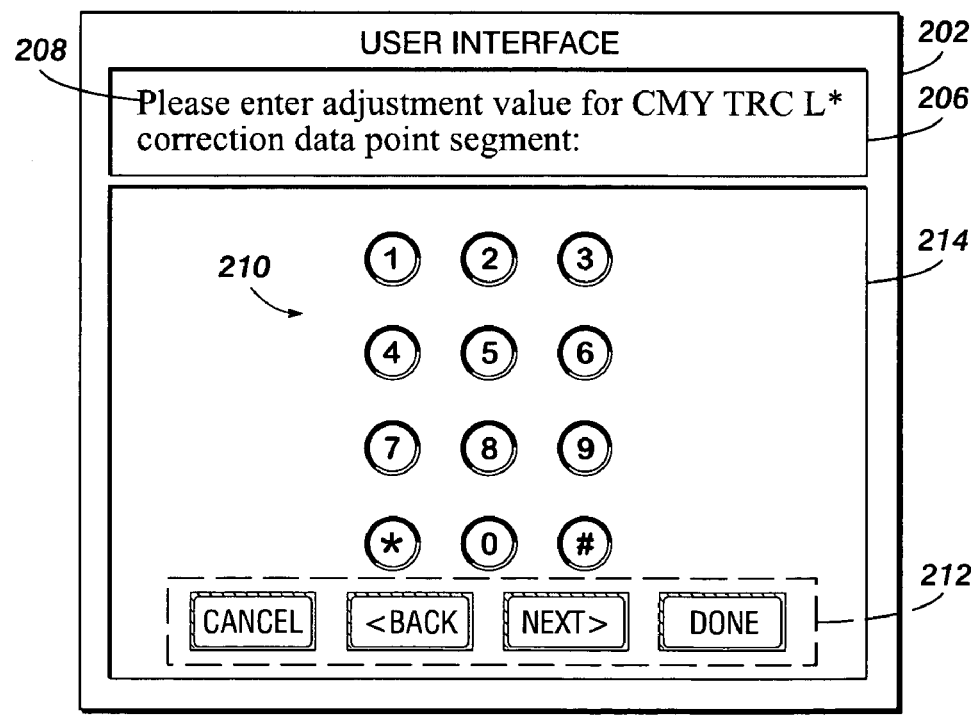
FIG. 5 is a schematic illustration of a printing device's calibration user interface.

FIG. 5 is a schematic illustration of the printing device's user interface 202 at one point during the calibration process. The user interface 202 comprises a display screen 206 and an input interface 214. The display screen 206 displays instructions 208 to the user. As illustrated, the user interface is waiting for an input of the adjustment value of the CMY TRC L* correction data point segment from the user. As illustrated, the input interface 214 may be one or a combination of known input devices, for example a numeric keypad 210 and a navigational keypad 212. However in other embodiments, the input interface could be one or a combination of any compatible input devices, for example a keyboard and a directional pad.

Figure 6:
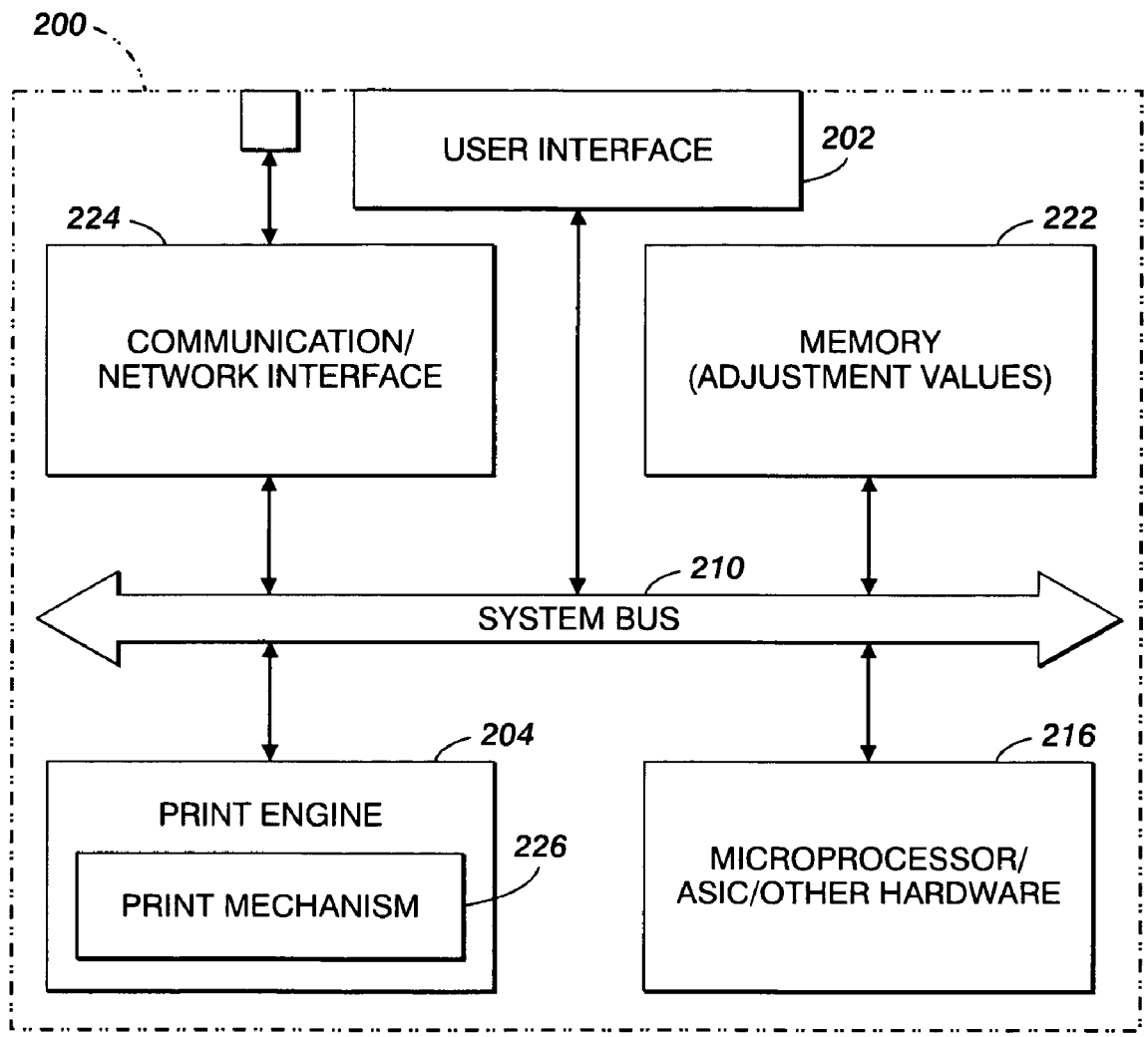
FIG. 6 is a block diagram of the printer illustrated in the system of FIG. 4.

FIG. 6 is a block diagram of the printer under calibration 200 of FIG. 4 adapted to function with a calibration sheet 160. The illustrated printer under calibration 200 comprises a system bus 218, a memory 222 connected to and accessible by other portions of the printer under calibration 200 through system bus 218, and hardware entities 216 connected to the system bus 218. At least some of the hardware entities 216 perform actions involving access to and use of memory 222. The hardware entities 216 may include microprocessors, ASICs, and other hardware for executing the calibration software.

As described above, the calibration software may be embedded in memory 222 or loaded on a computer terminal connected to the printer under calibration 200. The communication/network interface 224 provides a means for a computer terminal and the printer under calibration 200 to communicate.

The user interface 202 is connected to the system bus 218. The user interface 202 may comprise a display screen and an input interface (e.g. a numeric keypad and/or a navigational keypad). The user interface 202 provides a means for inputting data into the printer under calibration 200. The data is processed by the hardware entities 216 (e.g. a microprocessor). Some of the data (e.g. an adjustment value) is stored in memory 222.

The printer under calibration 200 further comprises a print engine 204 with a printing mechanism 226. Print engine 204 is connected to the system bus 218. Printing mechanism 226 may be capable of applying a plurality of different colorants to the calibration sheet 160. As described above, the colorants may include the colors of cyan, magenta, yellow, and black.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A calibration system, comprising:
   a printer capable of being calibrated; and
   a printable calibration sheet, the sheet comprising:
   at least one calibration reference segment printed on the sheet including one or more pre-selected colorants on the printable sheet; and
   one or more defined printing spaces on the sheet adjacent to the at least one calibration reference segment, the at least one or more defined printing spaces being arranged to accept printing of a color pattern from a printer under calibration;
   wherein the at least one calibration reference segment comprises at least one lightness correction segment, and wherein the at least one lightness correction segment comprises a printed reference background printed in a predetermined lightness with one or more colorants on the printable sheet.

2. The calibration system of claim 1, wherein the printable calibration sheet is a preprinted sheet of paper.

3. The calibration system of claim 1, wherein the one or more colorants comprise colorants selected from the groups consisting of cyan, magenta, yellow, and black.

4. The calibration system of claim 1, wherein the one or more defined printing spaces are arranged in a predetermined pattern.

5. The calibration system of claim 1, wherein the one or more defined printing spaces are elliptical.

6. The calibration system of claim 1, wherein the at least one calibration reference segment has been printed using the same type of printing device as the printer.

7. The calibration system of claim 1, wherein the printable calibration sheet further comprises an instruction segment including printed instructions for performing at least a portion of a calibration method.

8. The calibration system of claim 1, wherein the printable calibration sheet further comprises a registration segment to indicate whether the printer is in registration with the printable sheet.

9. The calibration system of claim 1, wherein the at least one calibration reference segment comprises at least one color balance segment.

10. The calibration system of claim 9, wherein the at least one color balance segment comprises a printed reference background printed in a predetermined hue with one or more colorants on the printable sheet.

11. The calibration system of claim 1, wherein the one or more defined printing spaces comprise a plurality of individual printing spaces.

12. The calibration system of claim 11, wherein the plurality of individual printing spaces are surrounded by the at least one calibration reference segment.

13. A method comprising:
  printing, with a reference printer, a calibration reference segment on a sheet-like printable medium while leaving at least one printing space on the sheet-like printable medium;
  subsequently printing on the at least one printing space with a printer to be calibrated;
  visually comparing a color in the at least one printing space with a color of the calibration reference segment;
  adjusting calibration properties of the printer to be calibrated based on results of the comparison;
  providing different sheets with calibration reference segments, and for respective ones of the different sheets, repeating the printing on the at least one printing space; and
  repeating the visual comparison of the color in the at least one printing space with the color of the calibration reference segment.

14. The method of claim 13, wherein:
  the color in the at least one printing space and the color of the calibration reference segment each comprise a mixture of cyan, magenta, and yellow colorants; and
  the visually comparing comprises determining a closest visual match in hue between the color of the at least one printing space with the color of the calibration reference segment.

15. The method of claim 13, wherein:
  the color in the at least one printing space and the color of the calibration reference segment each comprise a black colorant; and
  the visually comparing comprises determining a closest visual match in lightness between the color of the at least one printing space with the color of the calibration reference segment.

16. The method of claim 13, wherein the calibration reference segment comprises at least one color balance segment.

17. The method of claim 13, wherein the calibration reference segment comprises at least one lightness correction segment.

18. Apparatus comprising:
  a printer capable of being calibrated and a printable calibration sheet, the sheet comprising:
  at least one calibration reference region printed on the sheet including one or more pre-selected colorants on the printable sheet; and
  one or more defined printing regions on the sheet adjacent to the at least one calibration reference region, the one or more defined printing regions being arranged to accept printing of a color pattern from a printer under calibration;
  wherein the at least one calibration reference region comprises at least one lightness correction region, and wherein the at least one lightness correction region comprises a printed reference region printed in a predetermined lightness with one or more colorants on the printable sheet.

19. The apparatus according to claim 18, wherein the calibration reference region comprises a calibration reference segment, wherein the printing regions comprise printing spaces, and wherein the printed reference region comprises a printed reference background.

20. A method comprising:
  printing, with a reference printer, a calibration reference region on a sheet-like printable medium while leaving at least one printing space on the sheet-like printable medium;
  subsequently printing on the at least one printing space with a printer to be calibrated;
  visually comparing a color in the at least one printing space with a color of the calibration reference region;
  adjusting the calibration properties of the printer to be calibrated based on the results of the comparison;
  providing different sheets with calibration reference regions, and for respective ones of the different sheets, repeating the printing on the at least one printing space; and
  repeating the visual comparison of the color in the at least one printing space with the color of the calibration reference region.

* * * * *